Figure 1:
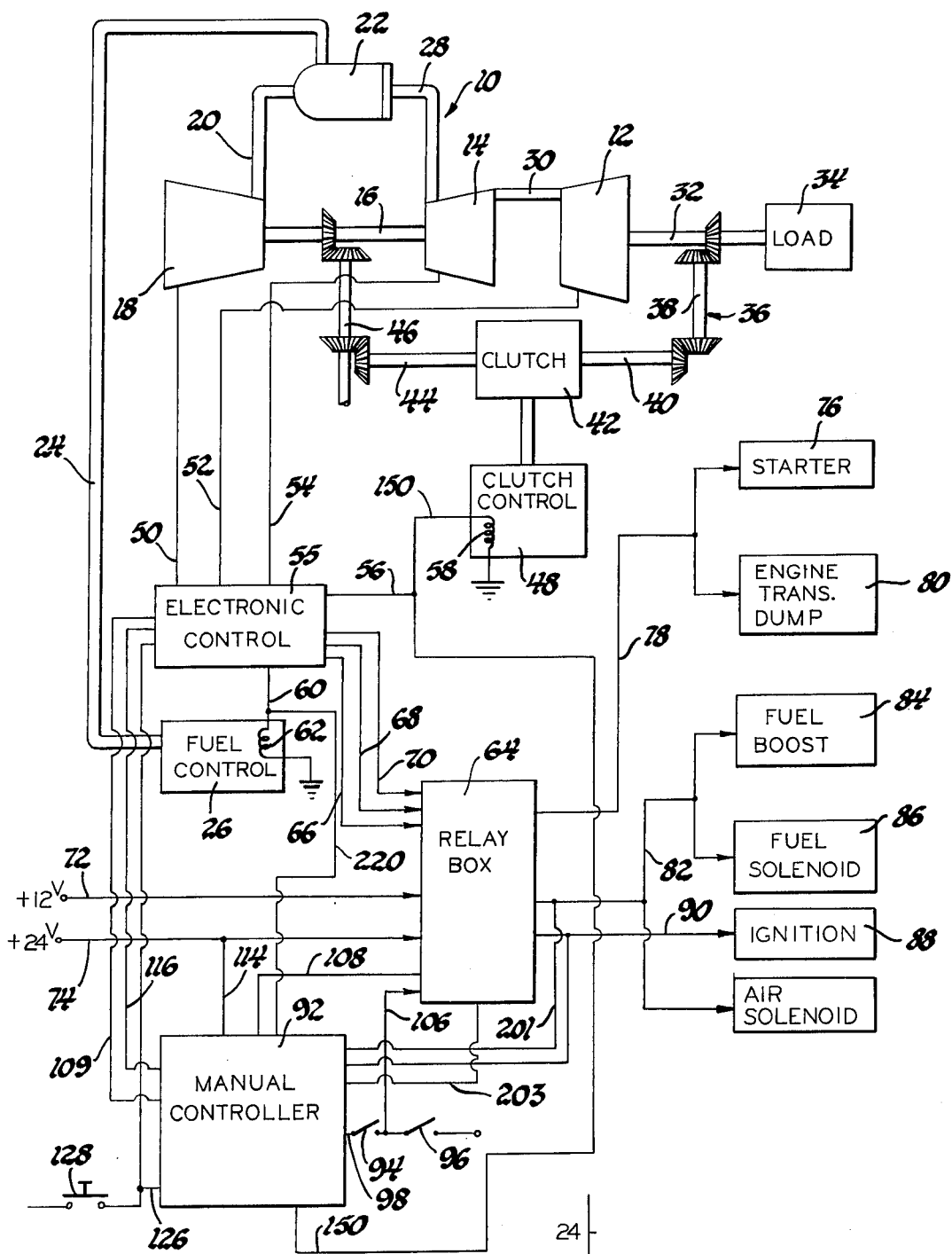

United States Patent [19]

Morrison

[11] 4,041,696
[45] Aug. 16, 1977

[54] VEHICLE TURBINE MANUAL CONTROL

[75] Inventor: Donald E. Morrison, Plainfield, Ind.

[73] Assignee: General Motors Corporation, Detroit, Mich.

[21] Appl. No.: 689,131

[22] Filed: May 24, 1976

[51] Int. Cl.² ............................ F02C 7/26; F02C 3/10
[52] U.S. Cl. ................................ 60/39.14; 60/39.16 S
[58] Field of Search .......... 60/39.14, 39.16 S, 39.28 R

[56] References Cited
U.S. PATENT DOCUMENTS

| 3,023,575 | 3/1962 | Haase et al. | 60/39.28 R |
| 3,691,759 | 9/1972 | Scheerer | 60/39.14 |

Primary Examiner—Carlton R. Croyle
Assistant Examiner—L. J. Casoregola
Attorney, Agent, or Firm—J. C. Evans

[57] ABSTRACT

A vehicular gas turbine engine includes a first electronic controller responsive to a plurality of engine operating parameters and associated with a power relay box to control operation of engine functions and further includes a manual controller that allows open loop operation of the engine to start and run it at a speed and power level independent of the electronic controller and associated signals of engine parameters. The manual controller includes a timer set to shut the engine down after a preselected time period of manual operation to prevent excessive use of the open loop control thereby to minimize possibility of engine damage.

5 Claims, 3 Drawing Figures

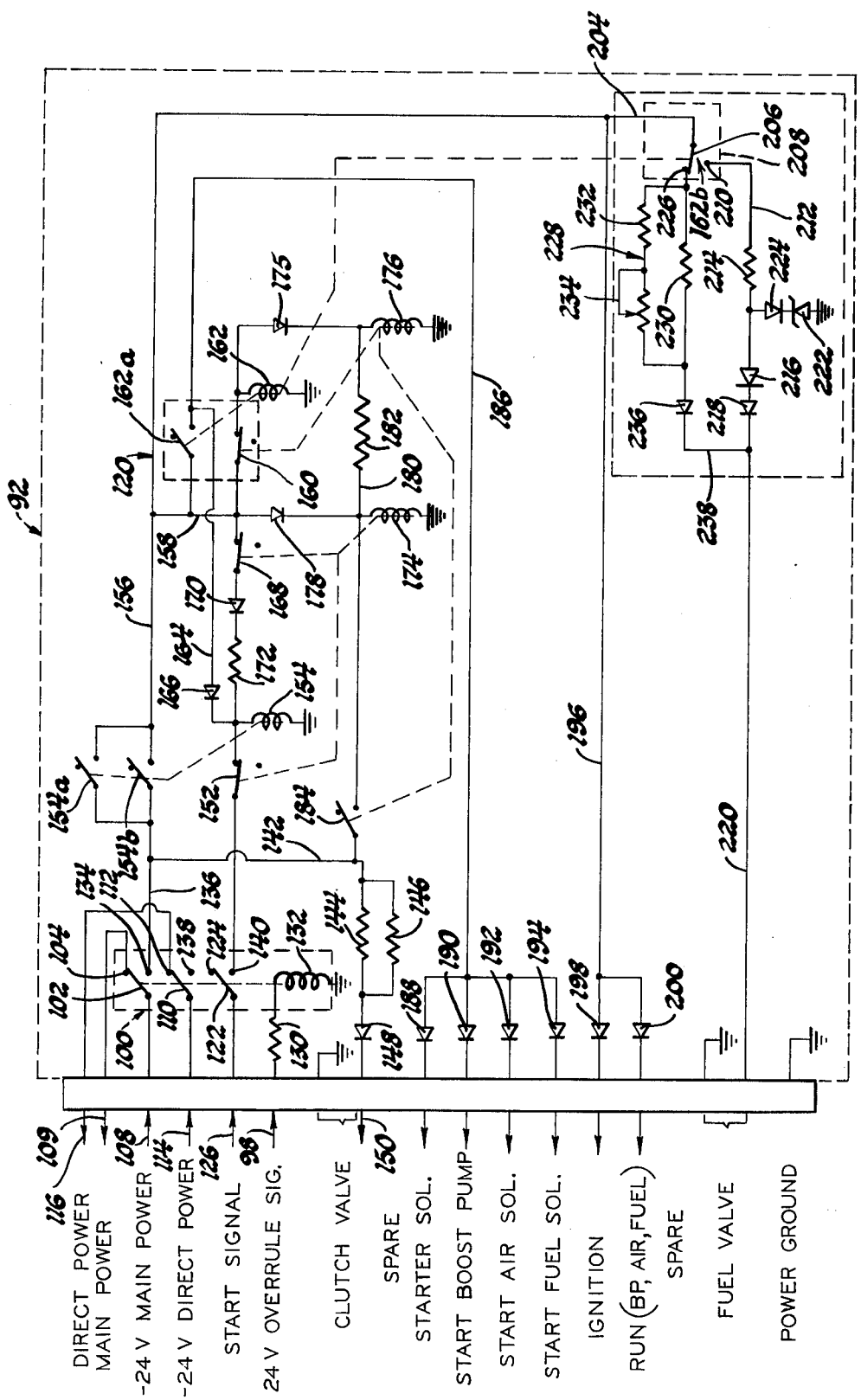

VEHICLE TURBINE MANUAL CONTROL

This invention relates to vehicular gas turbine engines and more particularly to electronic control circuits for vehicular gas turbine engines.

Various proposals to regulate the operation of vehicular type gas turbine engines have been suggested wherein power transfer clutch means are operated by an electronic control module in accordance with various engine operating parameters and fuel is supplied to a combustor burner element by an electronic control module in response to given engine parameters. An example of such power transfer and fuel controls are set forth in copending U.S. Ser. No. 356,292 now U.S. Pat. No. 3,964,506 to Grundman, filed May 2, 1973, and in U.S. Pat. No. 3,853,142, issued Dec. 10, 1974, to Grundman, respectively. The aforesaid controls are operative to regulate the output power of the gas turbine engines and to control its combustor temperature so as to vary the power level of operation of the engine.

Such systems typically include an electronic control box and relay box responsive to the electronic control to direct power supply to various electrically energizable auxiliary engine components such as the engine starter, igniter, engine power transfer dump control and fuel boost and fuel shut off units. Furthermore, the electronic control is associated with signals from a throttle sensor as well as speed signals from speed signal generating tachometers sensing the turbine speeds and also signals from thermocouples for sensing engine operating conditions such as the turbine inlet temperature of the engine.

In such systems, the electronic control continually senses the aforesaid parameters to modulate the amount of fuel supplied to the combustor so as to vary the operating power level of the engine and/or the amount of pressure in a power transfer clutch to vary the amount of interstage power transfer between first and second operating shafts of the engine.

In the event of failure of any of the automatic control components for the engine the engine is shut down and the vehicle will stop.

An object of the present invention is to supplement automatic controls for vehicular gas turbine engines including an electronic control system suitable for use in gas coupled types of gas turbine engines for driving a vehicle and to do so by the provision of an associated manual controller including means to allow open loop operation of the engine independent of the electronic control both to start and run the engine at a speed and power level sufficient to move it a limited predetermined distance and wherein fuel supply means to the combustor of the engine during a manual control start phase are operative to control fuel flow in accordance with the recovery rate of a battery voltage source connected to the engine starter during the manual start operation and wherein the manual controller further includes timer means set to shut the engine down after a predetermined time period of operation so as to avoid engine overtemperature or overspeed operation.

Still another object of the present invention is to include an approved manual override system for an automatically operated electronic control system for a gas turbine engine of a gas coupled type; said manual override system having means for automatic shutdown of the electronic control system including an override switch and means energizable to remove all power from the electronic control system during manual control operation and means to dump a power transfer clutch for a two shaft gas turbine engine during manual control operation.

Still another object of the present invention is to provide an improved manual control for open loop operation of a gas turbine engine through start and run phases maintained independent of an automatic electronic control for a gas turbine engine of the gas coupled type; the manual control including circuit means for energizing clutch control solenoid valve means and fuel valve means of a gas turbine engine control independently of the automatic electronic control and including manual control run and start relays and means for energizing said run and start relays when the automatic electronic control is disabled and wherein means including the start relay maintain a battery source energization circuit for a turbine starter and for connecting said battery source voltage to the energization circuit for the fuel control solenoid valve means to produce a ramped fuel control signal for increasing fuel flow to the engine as a function of engine speed increase during a manual start phase of operation and wherein further means are included, responsive to deenergization of the start relay to process fully battery voltage as an upper limit fuel control signal to the fuel valve means during a run period established by a run timer.

Further objects and advantages of the present invention will be apparent from the following description, reference being had to the accompanying drawings wherein a preferred embodiment of the present invention is clearly shown.

Figure 2:
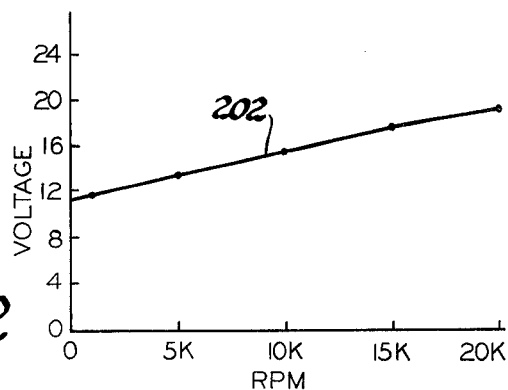

FIG. 1 is a schematic diagram of a gas turbine engine control circuit in accordance with the present invention; and FIG. 2 is a chart of a manually controlled, start voltage ramp curve for fuel control; and FIG. 3 is a circuit diagram of a manual controller associated with a schematic control system of FIG. 1.

Referring now to the drawings, FIG. 1 shows a vehicular gas turbine engine 10 of the type including a power turbine stage 12, gas coupled to a gasifier turbine stage 14. In the illustrated arrangement the gasifier turbine 14 is connected by a shaft 16 to a gasifier compressor 18 having its inlet connected to ambient air and an outlet connected through duct 20 to a combustor burner element 22 of the engine 10. In the illustrated arrangement, fuel supply to the combustor element 22 is through a supply conduit 24 under the control of a fuel control 26 of the type set forth more particularly in U.S. Pat. No. 3,853,142 issued Dec. 10, 1974, to Grundman. Fuel and air supplied to the combustor 22 are burned and directed through a duct 28 thence through the turbine stage 14 and across a second duct 30 for powering the turbine stage 12.

The power turbine stage 12 is connected by a shaft 32 to a load 34 representing the drive transmission and road wheel components of an associated vehicle. In the illustrated arrangement power transfer between gasifier shaft 16 and the power shaft 32 is under the control of a power transfer system 36 of the type set forth more particularly in copending U.S. Ser. No. 356,292 filed May 2, 1973, to Grundman. The system 36 includes a first power transfer gear train 38 to couple the power shaft 32 to an input 40 of a fluid pressurizable power transfer clutch 42 of the type more specifically set forth in the aforesaid Grundman, copending application. The clutch 42 has a second input 44 connected by a power transfer gear train 46 to couple the input 44 to the gasifier shaft 16. The power transfer clutch system 36 is under the control of a clutch control 48 as described in the Grundman application U.S. Ser. No. 356,292.

In the illustrated arrangement, various parameters of engine operating conditions such as the speed of the gasifier shaft 16, speed of the power shaft 32 and the turbine inlet temperature are directed through lines 50, 52, 54 respectively to an electronic control 55 to regulate an output signal on a line 56 connected to an electrically energizable coil 58 for controlling a control valve solenoid coil 58 in the clutch control 48. Concurrently, the electronic control 55 directs an output signal to line 60 for energizing a control valve solenoid coil 62 of fuel control 26 for regulating fuel flow to burner 22. Additionally, the control includes a relay box 64 connected by means of lines 66, 68, 70 to the electronic control 55 for controlling power supply from a twelve volt D.C. source 72 and a 24 volt D.C. source 74 to a plurality of auxiliary engine components. More particularly, during engine start, the electronic control 55 conditions the relay box 64 to connect an engine starter 76 with the power source 74 across a line 78. Line 78 also electrically connects to an engine transmission dump actuator 80 for unloading the engine during a start phase of operation. Additionally, the relay box 64 controls power supply to a line 82 and a fuel boost auxiliary 84 and a fuel shutoff auxiliary 86 that is operative under certain conditions to terminate engine operation. Also, the relay box 64 controls energization of an ignition circuit 88 through a line 90 during the start phase of operation. The aforesaid electronic and associated auxiliary engine components as well as the clutch control 48 and fuel control 26 are representative of automatic electronic control circuits for gas coupled type turbine engines for vehicular use. Such controls can take many forms and are operative to regulate the turbine inlet temperature of the turbines 12, 14 at a point to maintain maximum fuel efficiency under both idle and road speed conditions. Furthermore, they are operative to maintain a start phase of operation wherein the starter 76 accelerates both the gasifier and power turbine spools of the engine while the ignition circuit 88 maintains ignition of fuel in the burner element 22.

In accordance with the present invention, the control of FIG. 1 further includes a manual controller 92 which will bypass the normal engine control components set forth above. For example, in the illustrated arrangement the electronic control 55 will shut down when there is a failure to ignite an engine, if there is an overtemperature condition at the turbine inlet and if there is an overspeed condition. Furthermore, the control 55 will shut down if there is a failure in the electronic 20, the relay box 64, or in the various representatively illustrated pickups of engine operation parameters. In the event of a system failure involving any of the aforesaid components the engine can be shut down and the vehicle will stop.

In accordance with the present invention, the manual controller 92 operates independently of the control 55 and includes open loop operation of the engine to start it and run it at a speed and power level sufficient to maintain the vehicle operative for short distance movement.

The manual controller 92 is operated when the control 55 is shut down by operating a manual overrule mode selector switch 94 for connecting a 24 volt signal from ignition key switch 96 to manual controller 92 via line 98. During automatic electronic control a relay switch 100 (FIG. 3) is conditioned with a first movable contact 102 electrically connected to a fixed contact 104 to complete a main power circuit to the control 55 from a line 106 connected by key switch 96 to the 24 volt source thence through relay box 64 and a line 108 to the control contacts 102, 104 thence through line 109 to control 55. A movable contact 110 of the relay switch 100 is positioned against a fixed contact 112 to complete a direct power circuit from line 114 to line 116 of control 55. The relay switch 100 also connects control voltage to a line 136 to a relay and timer network 120 to be discussed.

The relay switch 100 further includes a third movable switch contact 122 that is positioned against a back contact 124 during the automatic control mode. Switch 122 is connected to line 126 which has a start signal imposed thereon through start switch 128.

The aforesaid control arrangement allows the vehicle driver to use a standard start procedure after selecting an overrule mode by operation of the manual mode selector switch 94 to its manual position. When the driver selects the manual overrule mode of operation the ignition key switch 96 is closed and the switch 94 is closed to direct a 24 volt overrule signal to line 98 thence to a resistor 130 connected to a coil 132 for conditioning the relay switch 100 into a manual mode of operation. The movable contact 102 is shifted from the contact 104 to interrupt the main power supply through line 109 to the electronic control 55. Contact 102 connects main power from line 108 through a fixed contact 134 connected to line 136 for supplying main power to the network 120. Concurrently, the movable contact 110 is moved from the fixed contact 112 to a back contact 138 to disconnect direct power on line 116 to the electronic control 55. The start signal contact 122 is moved from back contact 124 into electrical contact with a fixed contact 140 connecting the start signal line 126 to the network 120. The start signal is generated by operation of the start switch 128. Thus, all power is removed from the main electronic control 55 and power is supplied to the manual controller 92 to arm it. At the same time, current is supplied to condition the engine clutch valve coil 58 to dump the power transfer clutch 36 through a circuit including a line 142 from line 136 thence through parallel resistors 144, 146 and a diode 148 to an output line 150 that connects to the coil 58 as shown in FIG. 1.

If the vehicle transmission is in neutral, the start signal applied to line 98 starts the manual control cycle of operation. The start signal is transmitted through a normally close pair of contacts 152 of a run timer 174 that maintains a 50 second time delay period after which the contacts 152 are opened. The normally closed contacts 152, at the start of the manual control cycle, are closed to complete a circuit across a run relay switch coil 154. Energization of coil 154 will close normally open contacts 154a, 154b to complete a second relay energization circuit from line 136 through line 156 to the network 120 thence through a conductor 158 and across a normally closed pair of contacts 160 of a start timer 176 for maintaining a predetermined start cycle of manual control operation. The normally closed contacts 160 connect main power across a coil 162 of a start relay switch having a pair of normally open contacts 162a and a normally open pair of contacts 162b. Energization of the coil 162 will close contacts 162a and condition contacts 162b in a closed start position for purposes to be discussed.

Thus, after initiation of the manual operation, both the relay run coil 154 and relay start coil 162 are energized. A hold latch for relay coil 154 is created during the start cycle and run cycle by feedback of a voltage signal from the main power line 136 through line 156, 158 across closed contacts 162a (so conditioned when coil 162 is energized), thence through line 164 and diode 166 to coil 154. During the run phase of operation the hold latch is from the main power line 136 through the lines 156, 158 thence through closed contacts 168 of run timer 174 and a diode 170 which is connected across a resistor 172 to the coil 154.

Concurrently, with energization of the run relay coil 154, run timer 174 and a start timer 176 are energized to commence a full start and run cycle of time control. The energization circuit for the start timer 176 is maintained from the main power conductor 158 across diode 178 thence through conductor 180 and resistor 182 to the timer 176. The energization circuit for timer 174 is maintained from main power line 158 through diode 178 to the timer 174.

The start timer 176 is operative after a ten second delay period to open the normally closed contacts 160 and to close a normally open pair of contacts 184 connected between line 142 and the input to the timer 174. When contacts 160 are opened the power supply to the relay coil 162 is interrupted. Concurrently, a holding path to the timers 174, 176 is maintained through the closed contacts 184 until power to the manual controller 92 is turned off by turning off the vehicle key switch 96.

During the start cycle of the manual controller 92, voltage from the vehicle battery is supplied to the start solenoid from a start line 186 connected to the main power line 136 through switches 154a, 154b and the line 156. Line 186 supplies battery voltage to the solenoid of the starter 76 through a diode 188. Battery voltage is also supplied to the additional following circuit components from the line 186 as follows: to the start boost pump 84 through diode 190; to start air solenoids through a diode 192 and to the start fuel solenoid of the starter 76 through a diode 194. Additionally, a start and run circuit is completed from line 156 through a line 196 that connects main power supply across diode 198 to the ignition circuit 88 and across the diode 200 to various run circuits including boost pump, air and fuel solenoids. The auxiliary circuit components including fuel boost solenoid 84, fuel solenoid 86 and air solenoid 89 are 12 volt components. The battery voltage is reduced to this level during the start phase of manual operation. Hence, an auxiliary energization circuit is defined from line 186 through an external line 201 which bypasses relay box 64. During run operation a run boost pump, run fuel solenoid, and run air solenoid circuit are completed from line 196 through an external line 203 which is directed through resistors in relay box 64 to produce a voltage drop from a maximized run voltage at the D.C. battery source to protect the 12 volt auxiliary components.

There is an extremely heavy starter current drain on the main source represented by the 24 volt battery during engine start. For example, the starter current is in the order of 1800 amps and under such circumstances a battery supply voltage curve 202 is developed as shown in FIG. 2 having battery voltage on its ordinate and the gas turbine speed on its abscissa. The curve 202 has a positive slope in accordance with increased gasifier speed. Initially the battery voltage is reduced because of the extremely heavy starter current drain during the manual start mode of operation. However, the supply voltage increases as the gasifier speed accelerates along the slope of the curve 202.

In accordance with certain of the principles of the present invention this characteristics is used to provide a starting fuel current signal that increases in accordance with gasifier speed. Thus battery voltage having the characteristics shown in FIG. 2 is connected by a line 204 connected to a movable contact 206 of a switch 208 having a fixed contact 210 thereof connected by a line 212 to a resistor 214. Contacts 206, 210 represent previously mentioned start relay switch contacts 162b. The battery voltage is thus directed through the resistor 214 thence across series connected diodes 216, 218 and a line 220 to direct a fuel control signal to the valve coil 62 of the fuel control 26 during the manual mode of operation.

A maximum battery voltage signal is maintained by a Zener diode 222 connected in series with the resistor 214 through a blocking diode 224 to ground. A start current is directed through the line 220 for energization of the coil 62 which in one working embodiment is approximately 280 milliamps at the beginning of the start mode of manual operation. At a gasifier speed of 5000 rpm the fuel valve current increases to approximately 380 milliamps; at 10,000 rpm gasifier speed the fuel valve current increases to approximately 470 milliamps and at a gasifier speed of approximately 17,000 rpm fuel valve current approaches a clamped maximum level of approximately 555 milliamps. The resultant fuel flow for such a fuel current signal is from 0 pounds per hour to a maximum of 112 pounds per hour at the clamped maximum fuel valve current signal.

In the illustrated arrangement, following a ten second delay, the start timer 176 is conditioned to open switch 160 and de-energize coil 162. This causes the contacts 162a to be reopened and to also switch the fuel start switch contact 206 from the fixed contact 210 to a contact 226 for supplying current to a run current resistance network 228. The run current network includes a resistor 230 connected in parallel with a resistor 232 in series connection with a speed trim potentiometer 234. The resistance network is connected across a diode 236 thence through a line 238 to the fuel current line 220. Since the contacts 162a are open, start current is removed from line 186 and the starter is disengaged. The battery voltage as shown in FIG. 2 jumps to a steady state level of approximately 24 volts.

The steady state level of 24 volts is maintained during the run mode of manual control operation. During this mode, fuel valve current is controlled by resistors 230, 232 and potentiometer 234. This resistor network produces sufficient fuel current through line 220 to produce a resultant fuel flow to produce an inlet temperature at the inlet of the turbine stages of the engine 10 to produce a gasifier speed approximately 80% of the design speed. This speed is selected as representative of one adequate to maintain an engine power level required to move a fully loaded vehicle for a short distance completely independently of the control 55 and solely under the control of the manual controller 92.

Power is maintained to the ignition circuit 88 through the diode 198 and to the boost pump, nozzle air solenoid and fuel solenoid through the diode 200 after timer 176 is timed out and across resistors in box 64 to produce a 12 volt power source for the aforesaid solenoids. The run mode of manual control operation is maintained for a total of 50 seconds under the control of the run timer 174. Following this time delay period the timer 174 times out to open contacts 168 to interrupt the holding circuit for the relay coil 154. Accordingly, all power is cut off to the aforedescribed engine circuit. Closed run timer contacts 152 also are open when the run timer 174 completes its timed cycle to remove the start signal on line 126 from the delay coil 154.

Following the 10 second and 50 second timer run-out periods, the timers 174, 176 will remain in a timed out state. They will not reset until power is removed from the current path defined through the closed start timer contacts 184. As previously mentioned, the contacts 184 will remain closed until power is removed from the manual controller 92 by opening the ignition key switch 96. Various output diodes shown in the manual controller 92 including diodes 148, 188 through 200, 218 and 236 are incorporated to prevent voltage feedback into the manual controller during normal engine operation under the control of the electronic control 55.

In one working embodiment, both the start and run modes of operation and the resultant current signals through the start line 186, start and run lines 196 and fuel current line 220 are produced by means of circuit components having the following operating characteristics:

| ELEMENT | CHARACTERISTICS |
|---|---|
| Resistor 130 | 62 ohms |
| Resistor 144 | 30 ohms |
| Resistor 146 | 56 ohms |
| Diodes 166, 170, 175, 216, 218, 236 | Type IN4002 |
| Relay 154, 162 | Type KUP11D15-12 Volts (2PDT) (Potter-Brumfield) |
| Resistor 172 | 120 ohms |
| Timer 174 | Type R12-120-12-X2-E1 (Potter-Brumfield) |
| Timer 176 | Type R-12-120-24-X2-E1 (Potter Brumfield) |
| Resistor 230 | 50 ohms |
| Resistor 232 | 240 ohms |
| Speed Trim Potentiometer 234 | 1000 ohms Type CLU1021 (ohmite) |
| Resistor 214 | 20 ohms |
| Zener Diode 222 | IN 3998 |
| Diodes 148, 188 through 200 | Type MR 1121 Motorola |

By virtue of the aforesaid arrangement a vehicle operator can select manual control operation following failure of an automatic electronic controller for controlling gas turbine engine operation merely by operating a dash mounted switch to totally disable the automatic control. It also allows completely independent manual operation by the manual controller 92. The arrangement includes a normal starting sequence including operation of an ignition key (main switch) into on position before start. The same switch is used to stop the manual control mode of operation. A standard start button is used for start in the same manner as with automatic control modes of operation.

Start button depression will hold the starter operative during the time cycle of start timer 176. Fuel is not metered until the starter is engaged to produce a speed increase in the gasifier turbine. The speed change regulates the battery voltage schedule of curve 202 to produce a desired ramped fuel schedule in accordance therewith. When the start button is momentarily depressed, engine cranking will continue for the ten second start period unless overridden by the ignition key switch. This arrangement prevents continued fuel metering from the electronic boost pump of the engine in cases where the start button is momentarily depressed and the key switch is not subsequently turned off. In the aforesaid arrangement the run mode of manual operation is limited to a 50 second time period after which the engine operation is terminated. The key switch must be turned off and the start button must again be depressed for additional manual operation. This procedure is consistent with ignition key and start button operation to produce an automatic mode of operation.

The maximum fuel flow established by the controller 92 is low enough to prohibit excessive power turbine overspeed under no-load conditions of operation. The circuit of the manual controller 92 also causes clutch pressure to be dumped during the manual control mode of operation to prevent engine braking during the manual override operation wherein reduced power is utilized to temporarily move the vehicle.

While the embodiments of the present invention, as herein disclosed, constitute a preferred form, it is to be understood that other forms might be adopted.

The embodiments of the invention in which an exclusive property or privilege is claimed are defined as follows:

1. A gas turbine control system for controlling operation of a gas turbine engine starter and a gas turbine engine having a compressor driven by a turbine to supply air to a combustor having a fuel supply thereto for combustion with air to produce motive fluid for the turbine, said control system comprising: fuel control means energizable to modulate fuel flow to the combustor, automatic electronic control means responsive to predetermined engine parameters to produce a control signal connected to said fuel control means for control of engine operation, means for energizing said automatic electronic control means including a main switch and a start switch, a manual controller for energizing said fuel control means, means including said main switch and manual selector switch means to selectively and independently power said electronic control means and said manual controller, manual controller relay means responsive to operation of said main switch and said manual selector switch means when said electronic control means is disabled, said manual controller further including timer means energized in response to energization of said relay, a DC battery voltage source, start circuit means responsive to energization of said relay and timer means for connecting said DC voltage source to the starter of said engine during a start phase of operation, means connected in circuit relationship with said start circuit for directing an initially reduced battery voltage as produced by current flow through said start circuit means to said fuel control means during the start phase of operation to produce a ramped fuel signal to increase fuel flow as a function of engine speed increased during a manual start phase of operation.

2. A gas turbine control system for controlling operation of a gas turbine engine starter and a gas turbine engine having a compressor driven by a turbine to supply air to a combustor having a fuel supply thereto for combustion with air to produce motive fluid for the turbine, said control system comprising: fuel control means energizable to modulate fuel flow to the combustor, automatic electronic control means responsive to predetermined engine parameters to produce a control signal connected to said fuel control means for control of engine operation, means for energizing said automatic electronic control means including a main switch and a start switch, a manual controller for energizing said fuel control means, means including said main switch and manual selector switch means to selectively and independently power said electronic control means and said manual controller, manual controller relay means responsive to operation of said main switch and said manual selector switch means when said electronic control means is disabled, said manual controller further including timer means energized in response to energization of said relay, a DC battery voltage source, start circuit means responsive to energization of said relay and timer means for connecting said DC voltage source to the starter of said engine during a start phase of operation, means connected in circuit relationship with said start circuit for directing an initially reduced battery voltage as produced by current flow through said start circuit means to said fuel control means during the start phase of operation to produce a ramped fuel signal to increase fuel flow as a function of engine speed increased during a manual start phase of operation, means responsive to said timer means to impose a maximized battery voltage on said fuel control means following the manual start phase of operation, said last mentioned means including resistor means preselected to produce an upper limit fuel control signal to produce an approximately 80% engine speed operation during a manual controller run operation.

3. A gas turbine control system for controlling operation of an engine starter and a two-shaft gas turbine engine having a compressor driven by a first turbine to supply air to a combustor having a fuel supply thereto for combustion with air to produce motive fluid for the first turbine and a second power turbine for driving a load and wherein power transfer clutch means couple the first and second turbines, said control system comprising: fuel control means energizable to modulate fuel flow to the combustor, clutch control means energizable to control clutch pressure to vary power transfer between the first and second turbines, automatic electronic control means responsive to predetermined engine parameters to produce first and second control signals connected to said fuel control means and said clutch control means for control of engine operation, means including a main switch and a start switch for energizing said automatic control means, a manual controller for energizing said fuel control means and said clutch control means, means including said main switch and manual selector switch means to selectively and independently power said electronic control means and said manual controller, manual controller run relay means responsive to operation of said main switch and said manual selector switch means when said electronic control means is disabled, said manual controller further including timer means energized in response to energization of said relay, means to direct a clutch control signal from said manual controller to dump said control clutch pressure when the manual controller is energized, a DC battery voltage source, start circuit means responsive to energization of said relay and timer means for connecting said DC voltage source to the starter of said engine during a manual start phase of operation, meansconnected in circuit relationship with said start circuit for directing an initially reduced battery voltage as produced by current flow through said start circuit to said fuel control means during the manual control start phase of operation to produce a ramped fuel signal to increase fuel flow as a function of engine speed increase during the manual start phase of operation.

4. A gas turbine control system for controlling operation of an engine starter and a two-shaft gas turbine engine having a compressor driven by a first turbine to supply air to a combustor having a fuel supply thereto for combustion with air to produce motive fluid for the first turbine and a second power turbine for driving a load and wherein power transfer clutch means couple the first and second turbines, said control system comprising: fuel control means energizable to modulate fuel flow to the combustor, clutch control means energizable to control clutch pressure to very power transfer between the first and second turbines, automatic electronic control means responsive to predetermined engine parameters to produce first and second control signals connected to said fuel control means and said clutch control means for control of engine operation, means including a main switch and a start switch for energizing said automatic control means, a manual controller for energizing said fuel control means and said clutch control means, means including said main switch and manual selector switch means to selectively and independently power said electronic control means and said manual controller, manual controller run relay means responsive to operation of said main switch and said manual selector switch means when said electronic control means is disabled, said manual controller further including timer means energized in response to energization of said relay, a DC battery voltage source, start circuit means responsive to energization of said relay and timer means for connecting said DC voltage source to the starter of said engine during a manual start phase of operation, means connected in circuit relationship with said start circuit for directing an initially reduced battery voltage as produced by current flow through said start circuit to said fuel control means during the manual control start phase of operation to produce a ramped fuel signal to increase fuel flow as a function of engine speed increase during the manual start phase of operation, means responsive to said timer means to impose a maximized battery voltage on said fuel control means following the manual start phase of operation, said last mentioned means including resistor means preselected to produce an upper limit fuel control signal to produce an approximately 80% engine speed operation during a manual controller run operation.

5. A gas turbine control system for controlling operation of a gas turbine engine starter and a two-shaft gas turbine engine having a compressor driven by a first turbine to supply air to a combustor having a fuel supply thereto for combustion with air to produce motive fluid for the first turbine and a second power turbine for driving a load and wherein power transfer clutch means couple the first and second turbines, said control system comprising: fuel control means energizable to modulate fuel flow to the combustor, clutch control means energizable to control clutch pressure to vary power transfer between the first and second turbines, automatic electronic control means responsive to predetermined engine parameters to produce first and second control signals connected to said fuel control means and said clutch control means for control of engine operation, means including a main switch and a start switch for energizing said automatic control means, a manual controller for energizing said fuel control means and said clutch control means, means including said main switch and manual selector switch means to selectively and independently power said electronic control means and said manual controller, a manual controller run relay and start relay, means for energizing said run and start relays in response to energization of said manual controller, said manual controller further including a start timer with contacts and a run timer with contacts, said start and run timers being energized in response to energization of said start and run relays, means to direct a clutch control signal from said manual controller to dump said control clutch pressure when the manual controller is energized, means for defining a hold circuit for said timer and said run timer to prevent reset thereof until said main switch is operated on and off, a DC battery voltage source, start circuit means responsive to energization of said start relay for connecting said voltage source to the engine starter during a manual start phase of operation, means connected in circuit relationship with said start circuit for directing an initially reduced battery voltage as produced by current flow through said start circuit to said fuel control means during the manual control start phase of operation to produce a ramped fuel signal thereon which increased fuel flow as a function of engine speed increase during the manual start phase of operation, means responsive to deenergization of said start relay to impose full battery voltage on said fuel control solenoid valve means following the manual start phase of operation, said last mentioned means including resistor means preselected to produce an upper limit fuel control signal to produce an approximately 80% engine speed operation during manual controller run operation.

* * * * *

UNITED STATES PATENT OFFICE
CERTIFICATE OF CORRECTION

Patent No. 4,041,696　　　　　Dated August 16, 1977

Inventor(s) Donald E. Morrison

It is certified that error appears in the above-identified patent and that said Letters Patent are hereby corrected as shown below:

Column 11, line 10, beore "timer", first occurrence, insert -- start --.

Column 12, line 5, "increased" should read -- increases --.

Signed and Sealed this

Seventh Day of February 1978

[SEAL]

Attest:

RUTH C. MASON
Attesting Officer

LUTRELLE F. PARKER
Acting Commissioner of Patents and Trademarks